(12) United States Patent
Wang

(10) Patent No.: US 11,624,670 B1
(45) Date of Patent: Apr. 11, 2023

(54) MEASURING DEVICE AND METHOD FOR PORE THROAT PRESSURE OF JAMIN EFFECT BASED ON MECHANOCHROMIC MATERIALS

(71) Applicant: Qingdao University of Science and Technology, Qingdao (CN)

(72) Inventor: Fei Wang, Qingdao (CN)

(73) Assignee: QINGDAO UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/968,772

(22) Filed: Oct. 18, 2022

(51) Int. Cl.
| | | |
|---|---|---|
| G01L 7/18 | (2006.01) | |
| G01N 15/08 | (2006.01) | |
| E21B 43/26 | (2006.01) | |
| G01L 19/00 | (2006.01) | |
| G06T 7/90 | (2017.01) | |

(52) U.S. Cl.
CPC .......... *G01L 19/0092* (2013.01); *G01L 7/187* (2013.01); *G01N 15/0806* (2013.01); *G01N 15/0826* (2013.01); *G06T 7/90* (2017.01); *E21B 43/26* (2013.01); *G06T 2207/10024* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,794,114 A | * | 2/1974 | Brandon ................. | E21B 43/32 166/269 |
| 6,485,686 B1 | * | 11/2002 | Wick .................... | G01N 1/2273 435/308.1 |
| 6,491,872 B1 | * | 12/2002 | Wick ............... | G01N 33/48714 435/308.1 |
| 11,536,123 B1 | * | 12/2022 | Pu .......................... | E21B 43/20 |

FOREIGN PATENT DOCUMENTS

| | | | |
|---|---|---|---|
| CN | 113773822 B | * 1/2023 | |
| WO | WO-2019127563 A1 | * 7/2019 | .......... B01F 13/0059 |

* cited by examiner

*Primary Examiner* — Andre J Allen
(74) *Attorney, Agent, or Firm* — WPAT, P.C.

(57) ABSTRACT

A measuring device for pore throat pressure of Jamin effect based on mechanochromic materials is provided and includes: a bubble pressurization part, configured to inject bubbles into a microscopic visualization test part; the microscopic visualization test part including a mechanochromic material and a pore throat structure, configured to characterize changes of pore throat pressure during bubble injection; a waste liquid recycling part, configured to recycle bubble waste liquid passing through the microscopic visualization test part; a data acquisition and analysis part, configured to acquire changing data of the pore throat pressure in the microscopic visualization test part and analyze the changing data to obtain the pore throat pressure. The device is simple in structure and easy to operate, and provides a method for measuring an internal surface pressure of an object. The method can realize a real time measurement of the pore throat pressure of Jamin effect.

6 Claims, 2 Drawing Sheets

MEASURING DEVICE AND METHOD FOR PORE THROAT PRESSURE OF JAMIN EFFECT BASED ON MECHANOCHROMIC MATERIALS

TECHNICAL FIELD

The disclosure relates to the technical field of pore throat pressure measurement, in particular to a measuring device and method for pore throat pressure of Jamin effect based on mechanochromic materials.

BACKGROUND

Jamin effect refers to the additional resistance effect produced when a bead (liquid bead or bubble) in liquid-liquid or gas-liquid two-phase seepage flow passes through a pore throat or a narrow pore. In the pores of hydrocarbon reservoir rocks, the combination of capillary resistances caused by liquid beads and bubbles are very large, which is harmful to fluid seepage. However, Jamin effect can also be used to adjust the reservoir profile; for example, injecting emulsion, emulsified asphalt, gas-water mixture, or foam into the formation to plug the large pores, adjusting the fluid seepage profile, and enhancing oil recovery by increasing sweep volume of the displacement fluid.

Foam system is widely used in oil development. The change of pore throat pressure caused by Jamin effect is an important index to measure the plugging effect and profile control capability of the foam system.

At present, for the evaluation of the plugging effect of the foam system in porous media, the plugging performance of the overall foam is mainly reflected by the pressure difference or resistance factor by measuring the inlet pressure and the outlet pressure. However, in an application process, the phenomenon of local blockage or high local plugging pressure usually occurs, which affects the overall plugging effect. In such cases, it is impossible to judge by the pressure difference between the inlet and outlet ends. Based on the results of testing the displacement evaluation, due to the significant deviation caused by the difference of pore structures in actual formation, the application effect of the foam system is affected, resulting in significant asset losses. The measurement for pore throat pressure of Jamin effect is crucial.

To perform the measurement for the pore throat pressure, a current method mainly performs an overall measurement by measuring the pressure between two ends of the microstructure, but the key position of the pore throat cannot be measured. The difficulty is that the current open-type pressure measurement method will affect the foam and the pore throat structure once opening at the pore throat, which cannot reflect the real flow state.

SUMMARY

To overcome the above shortcomings in the prior art, the disclosure provides a measuring device and method for pore throat pressure of Jamin effect based on mechanochromic materials without changing foam and pore throat structures, which can effectively reflect changes of the pore throat pressure.

To achieve the above purpose of the disclosure, a technical solution used in the disclosure is: the measuring device for pore throat pressure of Jamin effect based on mechanochromic materials, including:

a bubble pressurization part, configured to inject bubbles into a microscopic visualization test part;

the microscopic visualization test part, including a mechanochromic material and a pore throat structure, the microscopic visualization test part being configured to characterize changes of pore throat pressure in a process of injecting the bubbles;

a waste liquid recycling part, configured to recycle bubble waste liquid passing through the microscopic visualization test part;

a data acquisition and analysis part, configured to acquire changing data of the pore throat pressure in the microscopic visualization test part and analyze the changing data to obtain the pore throat pressure.

The beneficial effects of the disclosure are as follows.

The device of the disclosure has simple structure and is easy to operate. It is an important supplement to the traditional open hole method and the optical method for measuring pressure, and provides a suitable method for measuring the internal surface pressure of an object.

In an embodiment, the bubble pressurization part includes a liquid storage tank, a peristaltic pump, a gas cylinder, and a gas flowmeter;

a liquid outlet of the liquid storage tank is connected to a syringe port of the peristaltic pump through a first needle valve, the gas cylinder is connected to an inlet of the gas flowmeter through a second needle valve, an outlet of the gas flowmeter is connected to the syringe port of the peristaltic pump through a third needle valve, and the syringe port of the peristaltic pump is also connected to a bubble inlet of the pore throat structure in the microscopic visualization test part.

The beneficial effect of the above embodiment is as follows. Any proportion of bubbles or foam system can be automatically injected into the pore throat structure through the structural setting of the bubble pressurization part, which is convenient for measuring the pore throat pressure under various conditions and improves the universality of the entire device.

In an embodiment, the syringe port of the peristaltic pump is a cross-shaped channel structure, the cross-shaped channel structure is connected with the first needle valve, the third needle valve, and the fourth needle valve.

The beneficial effect of the above embodiment is as follows. A syringe port of a traditional peristaltic pump is modified, so that one structure can be connected to multiple devices at the same time, which improves the measurement efficiency of the pore throat pressure and avoids the measurement error of noise during the replacement of different devices.

In an embodiment, the microscopic visualization test part is organic glass with the pore throat structure, an inner surface of the pore throat structure is coated with the mechanochromic material.

In an embodiment, the mechanochromic material is a CAM (color alteration mechanochromism) material, the mechanochromic material is composed of a titanium dioxide/polyvinyl alcohol ($TiO_2$/PVA) film whose top coated with a laponite/fluorescein film having green fluorescence.

The beneficial effect of the above embodiment is as follows. By using the feature that the color of the mechanochromic material changes with the pressure, the pore throat pressure can be quickly measured without changing the foam system and the pore throat structure.

In an embodiment, the waste liquid recycling part includes a back pressure valve, a waste liquid collection tank, and an intermediate container;

a bubble outlet of the microscopic visualization test part is connected to an inlet of the back pressure valve through a fifth needle valve, an outlet of the back pressure valve is connected to the intermediate container through a sixth needle valve, the waste liquid collection tank is disposed under a liquid outlet of the back pressure valve; and a pressure gauge is disposed in the intermediate container.

The beneficial effect of the above embodiment is as follows. By setting the waste liquid recycling part, the bubble waste liquid passing through the pore throat structure can be recycled, which can continuously measure the pore throat pressure under different bubble or foam systems.

In an embodiment, the data acquisition and analysis part includes a high-definition camera and a computer which are connected with each other;

the high-definition camera is disposed above a side of the microscopic visualization test part with the pore throat structure.

The beneficial effect of the above embodiment is as follows. The high-definition camera can acquire color images during the bubbles passing through the pore throat structure, thus the corresponding pore throat pressure can be measured.

In an embodiment, a light source is disposed under the microscopic visualization test part.

The beneficial effect of the above embodiment is as follows. By disposing the light source under the microscopic visualization test part, the high-definition camera can accurately acquire the color images corresponding to different pressure, thus more accurate measurement results of the pore throat pressure can be obtained.

A measuring method for the pore throat pressure of Jamin effect includes following steps:

S1, formulating a pressure-color plate based on performance of the mechanochromic material;

S2, preparing a liquid solution and adding the liquid solution to the liquid storage tank, and preparing a gas source;

S3, pumping the liquid solution and gas into the peristaltic pump successively, and injecting the bubbles into the microscopic visualization test part through the peristaltic pump;

S4, acquiring color images of the microscopic visualization test part in the process of injecting the bubbles through the high-definition camera in real time, and transmitting the color images to the computer;

S5, matching the color images with the pressure-color plate through the computer, and obtaining distribution data corresponding to the pore throat pressure.

The beneficial effects of the disclosure are as follows. The method of the disclosure can realize a real time measurement of the pore throat pressure of Jamin effect without changing foam and the pore throat structure, and convert the effect of pore throat pressure changes into pressure data, which can accurately analyze the action intensity of the bubbles and foam systems at the pore throat structure of Jamin effect.

In an embodiment, the step S1 specifically includes:

performing pressurization tests on a glass sample coated with the mechanochromic material, acquiring sample images under different pressure, recording corresponding relations of image colors and the pressure, thus formulating the pressure-color plate.

The step S3 specifically includes:

opening the first needle valve, closing the third needle valve and the fourth needle valve, using the peristaltic pump to suck the liquid solution into the peristaltic pump;

opening the gas cylinder, the second needle valve, and the third needle valve, closing the first needle valve, and using the peristaltic pump to suck gas in the gas cylinder into the peristaltic pump under monitoring of the gas flowmeter for mixing with the liquid solution to form the bubbles;

opening the fourth needle valve, closing the first needle valve and the third needle valve, using the peristaltic pump to inject the bubbles into the bubble inlet of the pore throat structure in the microscopic visualization test part.

In the step S4, in a process of the acquiring color images of the microscopic visualization test part in the process of injecting the bubbles through the high-definition camera in real time, the bubbles passing through the pore throat structure are recycled through the waste liquid recycling part, and a recycled method specifically includes:

measuring internal pressure of the intermediate container in real time through the pressure gauge in the intermediate container, when the internal pressure is greater than a set threshold value, opening the back pressure valve to suck the bubbles passing through the pore throat structure in the microscopic visualization test part from the bubble outlet into the waste liquid collection tank.

The beneficial effect of the above embodiment is as follows. Based on the feature that the color of the mechanochromic material changes with the pressure, formulating the pressure-color plate in advance, so that the corresponding pressure data can be determined when obtaining different color images later;

based on the cross-shaped channel structure of the syringe of the peristaltic pump, liquid and gas can be quickly mixed to obtain the bubbles with a desired proportion, and the bubbles are injected into the pore throat structure, which improves the measurement efficiency of the pore throat pressure; the bubbles passing through the pore throat structure are recycled through the waste liquid recycling part, thereby to form a continuous measurement of the pore throat pressure, which improves the measurement efficiency of the pore throat pressure.

Figure 1:
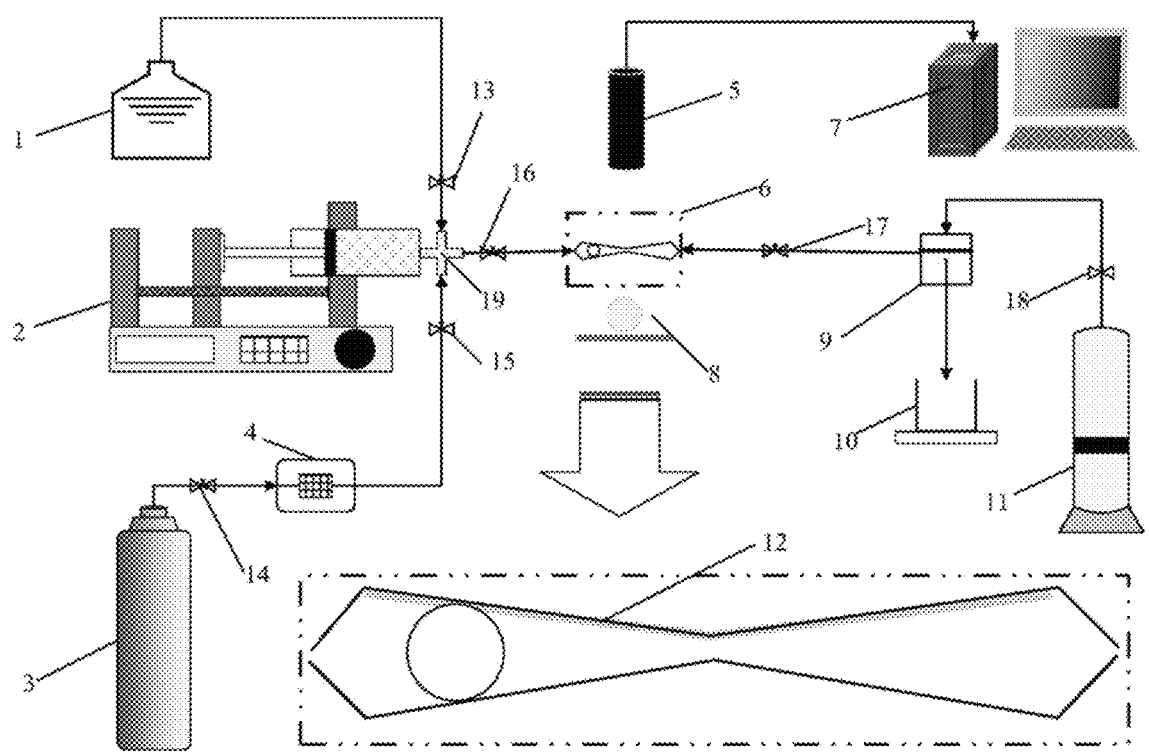
FIG. 1 is a structural diagram of a measuring device for pore throat pressure of Jamin effect based on mechanochromic materials provided by embodiments of the disclosure.

Description of Reference Numerals:

1-liquid storage tank; 2-peristaltic pump; 3-gas cylinder; 4-gas flowmeter; 5-high-definition camera; 6-microscopic visualization test part; 7-computer; 8-light source; 9-back pressure valve; 10-waste liquid collection tank; 11-intermediate container; 12-mechanochromic material; 13-first needle valve; 14-second needle valve; 15-third needle valve; 16-fourth needle valve; 17-fifth needle valve; 18-sixth needle valve; 19-cross-shaped channel structure.

DETAILED DESCRIPTION OF EMBODIMENTS

Specific embodiments of the disclosure are described below to facilitate understanding of the disclosure by those skilled in the art, it should be understood that the disclosure is not limited to the scope of the specific embodiments. For those skilled in the art, if different changes are within the spirit and scope of the disclosure defined and determined by the appended claims, these changes are obvious, and all inventions and creations based on the concept of the disclosure should be protected.

Embodiment 1

A measuring device for pore throat pressure of Jamin effect based on mechanochromic materials includes:
- a bubble pressurization part, configured to inject bubbles into a microscopic visualization test part 6;
- the microscopic visualization test part 6, including a mechanochromic material 12 and a pore throat structure, the microscopic visualization test part 6 being configured to characterize changes of pore throat pressure in a process of injecting the bubbles;
- a waste liquid recycling part, configured to recycle bubble waste liquid passing through the microscopic visualization test part 6;
- a data acquisition and analysis part, configured to acquire changing data of the pore throat pressure in the microscopic visualization test part 6 and analyze the changing data to obtain the pore throat pressure.

In an embodiment of the disclosure, as shown in FIG. 1, the bubble pressurization part includes a liquid storage tank 1, a peristaltic pump 2, a gas cylinder 3, and a gas flowmeter 4.

A liquid outlet of the liquid storage tank 1 is connected to a syringe port of the peristaltic pump 2 through a first needle valve 13. The gas cylinder 3 is connected to an inlet of the gas flowmeter 4 through a second needle valve 14. An outlet of the gas flowmeter 4 is connected to the syringe port of the peristaltic pump 2 through a third needle valve 15. The syringe port of the peristaltic pump 2 is also connected to a bubble inlet of the pore throat structure in the microscopic visualization test part 6.

Among them, the syringe port of the peristaltic pump 2 is a cross-shaped channel structure 19, the cross-shaped channel structure is connected with the first needle valve 13, the third needle valve 15, and the fourth needle valve 16, individually. The syringe port is easy to connect to other parts.

In the embodiment, the liquid storage tank 1 is configured to store liquid such as water or foam liquid. The peristaltic pump 2 is configured to suck the liquid and inject bubbles. The gas cylinder 3 is configured to provide gas. The gas flowmeter 4 is configured to monitor a gas volume entering the peristaltic pump 2 from the gas cylinder 3, so as to obtain the required bubbles.

In an embodiment of the disclosure, as shown in FIG. 1, the microscopic visualization test part 6 is organic glass with the pore throat structure, and an inner surface of the pore throat structure is coated with the mechanochromic material 12. The mechanochromic material 12 is a CAM material. The mechanochromic material 12 is composed of a titanium dioxide/polyvinyl alcohol $TiO_2$/PVA film whose top coated with a laponite/fluorescein film having green fluorescence.

In the embodiment, the mechanochromic material 12 can appear different colors with the change of pressure, thus the pore throat pressure can be determined by changes of the colors, and the pore throat size of the pore throat structure in the embodiment is at a micron level.

In an embodiment of the disclosure, the waste liquid recycling part includes a back pressure valve 9, a waste liquid collection tank 10, and an intermediate container 11.

A bubble outlet of the microscopic visualization test part 6 is connected to an inlet of the back pressure valve 9 through a fifth needle valve 17, and an outlet of the back pressure valve 9 is connected to the intermediate container 11 through a sixth needle valve 18. The waste liquid collection tank 10 is disposed under a liquid outlet of the back pressure valve 9, and a pressure gauge is disposed in the intermediate container 11.

The back pressure valve 9 in the embodiment is configured to provide back pressure, and the back pressure is controlled by the gas in the intermediate container 11 which is provided with the pressure gauge. The waste liquid collection tank 10 is configured to collect the bubble waste liquid passing through the pore throat structure.

In an embodiment of the disclosure, the data acquisition and analysis part includes a high-definition camera 5 and a computer 7 which are connected with each other.

The high-definition camera 5 is disposed above a side of the microscopic visualization test part 6 with the pore throat structure.

In the embodiment, the high-definition camera 5 is configured to capture images of a surface layer of the microscopic visualization test part 6, and the computer 7 is configured to store and analyze captured images and determine pore throat pressure data.

In an embodiment of the disclosure, a light source 8 is disposed under the microscopic visualization test part 6. The high-definition camera 5 can acquire clearer images of the surface layer of the microscopic visualization test part 6 by illuminating the microscopic visualization test part 6 with the light source 8.

Embodiment 2

Figure 2:
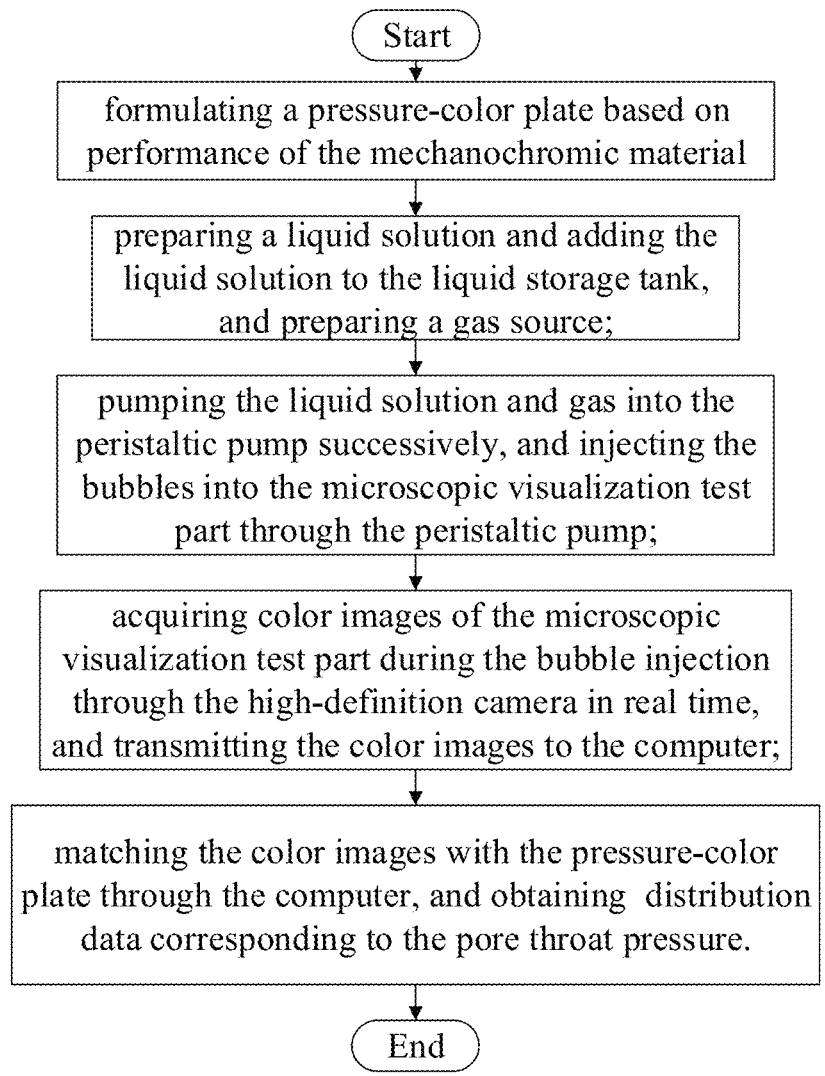
FIG. 2 is a flow chart of a measuring method for the pore throat pressure of Jamin effect based on mechanochromic materials provided by the embodiments of the disclosure.

As shown in FIG. 2, a measuring method for the pore throat pressure of Jamin effect includes following steps:
- S1, formulating a pressure-color plate based on performance of the mechanochromic material;
- S2, preparing a liquid solution and adding the liquid solution to the liquid storage tank, and preparing a gas source;
- S3, pumping the liquid solution and gas into the peristaltic pump successively, and injecting the bubbles into the microscopic visualization test part through the peristaltic pump;
- S4, acquiring color images of the microscopic visualization test part in the process of injecting the bubbles through the high-definition camera in real time, and transmitting the color images to the computer;
- S5, matching the color images with the pressure-color plate through the computer, and obtaining distribution data corresponding to the pore throat pressure.

In the embodiment of the disclosure, the step Si specifically includes:
- performing pressurization tests on a glass sample coated with the mechanochromic material, acquiring sample images under different pressure, recording corresponding relations between image colors and the pressure, thus formulating the pressure-color plate. Based on the feature that the color of the mechanochromic material changes with the pressure, the pressure-color plate is formulated in advance, so that the corresponding pressure data can be determined when obtaining different color images later.

The step S3 specifically includes:
- opening the first needle valve, closing the third needle valve and the fourth needle valve, using the peristaltic pump to suck the liquid solution into the peristaltic pump;

opening the gas cylinder, the second needle valve, and the third needle valve, closing the first needle valve, and using the peristaltic pump to suck gas in the gas cylinder into the peristaltic pump under monitoring of the gas flowmeter for mixing with the liquid solution to form the bubbles.

In the step S3, based on the cross-shaped channel structure of the syringe of the peristaltic pump, liquid and gas can be quickly mixed to obtain the bubbles with a desired proportion, and the bubbles are injected into the pore throat structure, which improves the measurement efficiency of the pore throat pressure.

In the step S4, in a process of the acquiring color images of the microscopic visualization test part in the process of injecting the bubbles through the high-definition camera in real time, the bubbles passing through the pore throat structure are recycled through the waste liquid recycling part, and a recycled method specifically includes:

measuring internal pressure of the intermediate container in real time through the pressure gauge in the intermediate container, when the internal pressure is greater than a set threshold value, opening the back pressure valve to suck the bubbles passing through the pore throat structure in the microscopic visualization test part from the bubble outlet into the waste liquid collection tank.

In the step S4, the bubbles passing through the pore throat structure are recycled through the waste liquid recycling part to form a continuous measurement of the pore throat pressure, which improves the measurement efficiency of the pore throat pressure.

Embodiment 3

The embodiment provides an example of performing a measurement of the pore throat pressure based on the above measuring method, including following steps.

(1) The mechanochromic material is determined as a CAM material (e.g., the mechanochromic material composed of a titanium dioxide/polyvinyl alcohol (TiO$_2$/PVA) film whose top coated with a laponite/fluorescein film having green fluorescence). Sample training on the mechanochromic material 12 is performed: performing pressurization tests on a glass sample coated with the mechanochromic material 12; pressure gradually increases from 0.01 megapascals (MPa) to 10 MPa; sample images are acquired under different pressure and colors are extracted, thus formulating a pressure-color plate as shown in TABLE 1.

TABLE 1

| | Pressure/MPa | | |
|---|---|---|---|
| | 0.01 | 0.05 | 0.1 |
| Color/RGB | (152, 251, 152) | (143, 188, 152) | (50, 205, 50) |
| | Pressure/MPa | | |
| | 0.2 | 0.5 | 1 |
| Color/RGB | (0, 255, 0) | (127, 255, 0) | (154, 205, 50) |
| | Pressure/MPa | | |
| | 2 | 5 | 10 |
| Color/RGB | (255, 255, 0) | (255, 215, 0) | (255, 165, 0) |

(2) For preparing a liquid solution for a foam system, 0.3 weight percentage content (wt %) sodium dodecyl sulfate (SDS) solution is added into the liquid storage tank 1; and a gas cylinder 3 provides nitrogen (N$_2$).

(3) The first needle valve 13 is opened, and the third needle valve 15 and the fourth needle valve 16 are closed; then a peristaltic pump 2 is used to suck the solution into a syringe; the first needle valve 13 is closed, and the third needle valve 15, the second needle valve 14 and the gas cylinder 3 are opened, then the nitrogen is pumped into the peristaltic pump 2 through a gas flowmeter 4 at a injecting speed of 0.04 mL/min; the fourth needle valve 16 is opened, and the first needle valve 13 and the third needle valve 15 are closed, then back pressure of a back pressure valve 9 is set to be 0.5 MPa, and the peristaltic pump 2 is used to inject bubbles into a microscopic visualization test part 6 at a injecting speed of 0.06 mL/min.

(4) The images of a surface layer of the microscopic visualization test part 6 are acquired in real time through a high-definition camera 5.

(5) The computer 7 is used to analyze acquired images, then it is matched with a corresponding pressure-color plate, thus pressure distribution data along the pore throat structure is obtained.

Based on analysis of the acquired images, where color data of three acquisition points are: (130, 190, 130), (45, 210, 45), (10, 255, 10). Compared with values of colors in TABLE 1, corresponding pressure of the three acquisition points is about: 0.06 MPa, 0.11 MPa, 0.19 MPa.

Based on the pressure distribution data, the method in the embodiment can effectively obtain corresponding values of the pore throat pressure according to color changes. And if a measuring range of the pressure-color plate formulated formerly is smaller, a value of the pore throat pressure measured later is more accurate.

In the description of the disclosure, it should be understood that the terms such as "center", "thickness", "top", "bottom", "horizontal", "top", "bottom", "inside", "outside", "radial", indicating the orientation or position relationship based on the attached drawings, which is only for the convenience of describing the disclosure and simplifying the description, rather than indicating or implying that the device or parts in the disclosure must have a specific orientation and constructed and operated in the specific orientation, and therefore cannot be understood as a limitation of the disclosure. In addition, the terms such as "first", "second", and "third" are only used for describing purposes and cannot be understood as indicating or implying the relative importance of the features or implicitly indicating the number of technical features. Therefore, the features defined by "first", "second", and "third" can explicitly or implicitly include one or more of the features.

What is claimed is:

1. A measuring device for pore throat pressure of Jamin effect based on mechanochromic materials, comprising:
   a bubble pressurization part, configured to inject bubbles into a microscopic visualization test part;
   the microscopic visualization test part, comprising a mechanochromic material and a pore throat structure, and wherein the microscopic visualization test part is configured to characterize changes of pore throat pressure in a process of injecting the bubbles;
   a waste liquid recycling part, configured to recycle bubble waste liquid passing through the microscopic visualization test part;
   a data acquisition and analysis part, configured to acquire changing data of the pore throat pressure in the microscopic visualization test part and analyze the changing data to obtain the pore throat pressure;

wherein the bubble pressurization part comprises a liquid storage tank, a peristaltic pump, a gas cylinder, and a gas flowmeter;

a liquid outlet of the liquid storage tank is connected to a syringe port of the peristaltic pump through a first needle valve, the gas cylinder is connected to an inlet of the gas flowmeter through a second needle valve, an outlet of the gas flowmeter is connected to the syringe port of the peristaltic pump through a third needle valve, the syringe port of the peristaltic pump is further connected to a bubble inlet of the pore throat structure in the microscopic visualization test part;

the microscopic visualization test part is organic glass with the pore throat structure;

an inner surface of the pore throat structure is coated with the mechanochromic material;

the waste liquid recycling part comprises a back pressure valve, a waste liquid collection tank, and an intermediate container;

a bubble outlet of the microscopic visualization test part is connected to an inlet of the back pressure valve through a fifth needle valve, an outlet of the back pressure valve is connected to the intermediate container through a sixth needle valve, the waste liquid collection tank is disposed under a liquid outlet of the back pressure valve;

a pressure gauge is disposed in the intermediate container;

the data acquisition and analysis part comprises a high-definition camera and a computer which are connected with each other; and the high-definition camera is disposed above a side of the microscopic visualization test part with the pore throat structure.

2. The measuring device for pore throat pressure of Jamin effect based on mechanochromic materials according to claim 1, wherein the syringe port of the peristaltic pump is a cross-shaped channel structure, the cross-shaped channel structure is connected with the first needle valve, the third needle valve, and the fourth needle valve.

3. The measuring device for pore throat pressure of Jamin effect based on mechanochromic materials according to claim 1, wherein the mechanochromic material is a CAM (color alteration mechanochromism) material, the mechanochromic material is composed of a titanium dioxide/polyvinyl alcohol ($TiO_2$/PVA) film whose top coated with a laponite/fluorescein film having green fluorescence.

4. The measuring device for pore throat pressure of Jamin effect based on mechanochromic materials according to claim 1, where a light source is disposed under the microscopic visualization test part.

5. A measuring method for the pore throat pressure of Jamin effect based on the measuring device according to claim 1, comprising following steps:

S1, formulating a pressure-color plate based on performance of the mechanochromic material;

S2, preparing a liquid solution and adding the liquid solution to the liquid storage tank, and preparing a gas source;

S3, pumping the liquid solution and gas into the peristaltic pump successively, and injecting the bubbles into the microscopic visualization test part through the peristaltic pump;

S4, acquiring color images of the microscopic visualization test part in the process of injecting the bubbles through the high-definition camera in real time, and transmitting the color images to the computer;

S5, matching the color images with the pressure-color plate through the computer, and obtaining distribution data corresponding to the pore throat pressure.

6. The measuring method for the pore throat pressure of Jamin effect according to claim 5, wherein the step S1 specifically comprises:

performing pressurization tests on a glass sample coated with the mechanochromic material, acquiring sample images under different pressure, recording corresponding relations of image colors and the pressure, thereby formulating the pressure-color plate;

wherein the step S3 specifically comprises:

opening the first needle valve, closing the third needle valve and the fourth needle valve, using the peristaltic pump to suck the liquid solution into the peristaltic pump;

opening the gas cylinder, the second needle valve, and the third needle valve, closing the first needle valve, and using the peristaltic pump to suck the gas in the gas cylinder into the peristaltic pump under monitoring of the gas flowmeter for mixing with the liquid solution to form the bubbles; and opening the fourth needle valve, closing the first needle valve and the third needle valve, using the peristaltic pump to inject the bubbles into the bubble inlet of the pore throat structure in the microscopic visualization test part;

wherein in the step S4, in a process of the acquiring color images of the microscopic visualization test part in the process of injecting the bubbles through the high-definition camera in real time, recycling the bubbles passing through the pore throat structure through the waste liquid recycling part, and a method of the recycling specifically comprises:

measuring internal pressure of the intermediate container in real time through the pressure gauge in the intermediate container, when the internal pressure is greater than a set threshold value, opening the back pressure valve to suck the bubbles passing through the pore throat structure in the microscopic visualization test part from the bubble outlet into the waste liquid collection tank.

* * * * *